(12) United States Patent
Beall et al.

(10) Patent No.: US 6,506,336 B1
(45) Date of Patent: Jan. 14, 2003

(54) FABRICATION OF ULTRA-THINWALL CORDIERITE STRUCTURES

(75) Inventors: Douglas M. Beall, Painted Post, NY (US); Gregory A. Merkel, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 163 days.

(21) Appl. No.: 09/651,932

(22) Filed: Aug. 31, 2000

Related U.S. Application Data

(60) Provisional application No. 60/151,856, filed on Sep. 1, 1999.

(51) Int. Cl.[7] ................................................. B28B 3/20
(52) U.S. Cl. .................... 264/630; 264/638; 264/177.12
(58) Field of Search ................................. 264/630, 638, 264/177.12

(56) References Cited

U.S. PATENT DOCUMENTS

| | | |
|---|---|---|
| 2,684,919 A | 7/1954 | Berry et al. |
| 3,885,977 A | 5/1975 | Lachman et al. |
| 4,316,965 A | 2/1982 | Oda et al. |
| 4,421,699 A | 12/1983 | Inoguchi et al. |
| 4,434,117 A | 2/1984 | Inoguchi et al. |
| 4,745,092 A | 5/1988 | Prunier, Jr. et al. |
| 4,772,580 A | 9/1988 | Hamanaka et al. |
| 4,810,681 A | 3/1989 | Hayakawa |
| 4,849,275 A | 7/1989 | Hamaguchi et al. |
| 4,869,944 A | 9/1989 | Harada et al. |
| 4,877,670 A | 10/1989 | Hamanaka |
| 4,950,628 A | 8/1990 | Landon et al. |
| 5,030,398 A | 7/1991 | Hamanaka et al. |
| 5,114,643 A | 5/1992 | Beall et al. |
| 5,114,644 A | 5/1992 | Beall et al. |
| 5,141,686 A | 8/1992 | Murtagh |
| 5,258,150 A | 11/1993 | Merkel et al. |
| 5,262,102 A | 11/1993 | Wada |
| 5,270,270 A | 12/1993 | Semar et al. |
| 5,281,462 A | 1/1994 | Day et al. |
| 5,332,703 A | 7/1994 | Hickman |
| 5,409,870 A | 4/1995 | Locker et al. |
| 5,552,349 A | 9/1996 | Ichii et al. |
| 5,607,885 A | 3/1997 | Ichii et al. |
| 6,004,501 A | 12/1999 | Cornelius et al. |
| 6,087,281 A | 7/2000 | Merkel |

*Primary Examiner*—Christopher A. Fiorilla
(74) *Attorney, Agent, or Firm*—Kees van der Sterre; Timothy M. Schaeberle

(57) ABSTRACT

A plasticizable raw material mixture for use in preparing a substrate having cordierite as its primary phase with a mixture of a chemical composition, percent by weight, of 11 to 17% MgO, 33 to 41% $Al_2O_3$ and, 46 to 53% $SiO_2$, the mixture including the following (1) a platy talc having a morphology index of greater than 0.8 and exhibiting a mean particle size of less than about 5 $\mu$m; (2) an $Al_2O_3$ forming source comprising an alumina having a mean particle size of less than about 5 $\mu$m selected from the group consisting of -alumina, transition aluminas, aluminum oxide monohydroxide, or aluminum trihydrate having; and, (3) one or more of the components of delaminated kaolin having a mean particle size of less than about 2 $\mu$m, calcined kaolin exhibiting a mean particle size of less than about 2 $\mu$m and a surface area of greater than about 10 $m^2$/g and/or silica having a mean particle size of less than about 5 $\mu$m., and a method of producing a green body by compounding and plasticizing a cordierite-forming raw material mixture, forming the mixture into a green ceramic body by extrusion through an extrusion die to at least partially align the raw materials in an orientation plane in such a manner that the shrinkage of the green ceramic body upon firing is anisotropic and is greater in direction perpendicular to the orientation plane than in at least one other direction in the green ceramic body.

15 Claims, 1 Drawing Sheet

FABRICATION OF ULTRA-THINWALL CORDIERITE STRUCTURES

This application claims the benefit of U.S. Provisional Application No. 60/151,856, filed Sep. 1, 1999, entitled "Fabrication of Ultra Thinwall Cordierite Structures", by Beall.

BACKGROUND OF THE INVENTION

1. Field of the Invention

The invention relates to cordierite ceramic bodies for use as catalyst carriers, particularly to cordierite bodies, having ultra-thin web sizes, for use as catalyst carriers for purifying automobile exhaust gas, and particularly to a method for producing these ultra thinwall cordierite structures.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to, reduce the quantities of pollutants from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to cordierite ceramics' high thermal shock resistance. The production of cordierite ($2MgO.2Al_2O_3.5SiO_2$) ceramics from mineral batches containing sources of magnesium, aluminum and silicon such as clay and talc is well known. Such a process is described in U.S. Pat. No. 2,684,919. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one axis.

Manufacturers work continuously to optimize the characteristics of cordierite substrates to enhance their utility as catalyst carriers. Specifically, manufacturers continually strive to develop cordierite honeycomb substrates that possess smaller and smaller web or wall sizes. Demand for cordierite monoliths having very thin webs is increasing in response to legislation requiring higher conversion efficiencies in catalytic converters for the automobile market. Thinner webs reduce the mass of the substrate resulting in faster light-off times. In addition, higher geometric surface areas may be achieved without an increase in the mass of the substrate. Another advantage of thin walled substrates is that a lower back pressure may be achieved.

The production of honeycomb substrates with very thin webs is, however, very difficult, when compared with substrates with more conventional geometry. It has been found that when conventional extrusion apparatus are used to produce ceramic honeycombs with web thicknesses of less than 100 $\mu$m (i.e., ultra-thinwall bodies), an unacceptably high number of breaks in the web of the cellular extrudate (i.e., areas containing no ceramic material) are observed in the extruded product. It is thought that these breaks in the ceramic material result from one or more particles from the extrusion material plugging a slot in the extrusion die, resulting in a region where batch is restricted from flowing. The number of breaks increases as the slot width decreases, and if the slot width is narrow enough, the number of plugged cells becomes so great that the extrudate does not hold together, but rather the extrusion consists of many small strands of batch material.

Further, the extrusion of ceramic honeycombs articles with very thin webs is made difficult by the reduced ability of the wet extrudate to support its own weight. As a result, slumping of the article is common because of the lower strength of the thin webs.

Another difficulty in the extrusion of ceramic honeycomb articles with very thin webs is that small differences in slot width in the die can lead to problems with differential flow rates of the batch material. This differential flow can result in distortion of the honeycomb cell structure.

A further problem associated with conventional extrusion of ultra thin wall cordierite substrates with high cell density is that a multi-component die design is required since the feedholes for a conventional one-piece die design would be too close together, or too small to be drilled. However, when a composition exhibiting a moderately high degree of radial shrinkage is used, a conventional and much less expensive die design is made possible in order to increase the cell density during firing to a level only possible through the use of a multi-component die approach when using materials giving a low level of shrinkage.

The discovery of a method of making ultra-thinwall cordierite that overcame the aforementioned shortcomings of conventional methods and a method that was capable of being used with conventional extrusion apparatus would be highly desirable and an advancement in the art.

SUMMARY OF THE INVENTION

It is therefore a principal object of the present invention to provide an improved method for making ultra-thinwall cordierite ceramics, that produces little, if any discontinuities in the ceramic article and which can be utilized with conventional extrusion apparatus/dies. It has been found that when certain combinations of raw materials are used, the raw materials upon extrusion through a thin slot partially align to form an orientation plane. Specifically, it has been discovered that the combination of platy talc and clay raw materials, when used in the preparation of cordierite honeycomb structures, form, upon extrusion a raw material orientation plane that is generally parallel to the web or wall direction. It follows that the green bodies exhibiting this oriented raw material structure exhibit anisotropic shrinkage; a higher degree of shrinkage in a direction perpendicular to the orientation plane (i.e., thickness of the wall shrinkage) than in any other direction; e.g. the radial and axial directions.

More specifically, this invention relates to a plasticizable raw material mixture for use in preparing a substrate having cordierite as its primary phase with the mixture comprised of a chemical composition, percent by weight, of 11 to 17% MgO, 33 to 41% $Al_2O_3$ and, 46 to 53% $SiO_2$. The raw material mixture specifically comprises the following (1) a platy talc having a morphology index of greater than 0.8 and exhibiting a mean particle size of less than about 1 $\mu$m when measured by a Sedigraph particle analyzer (Micromeritics); (2) an $Al_2O_3$ forming source comprising an alumina having a mean particle size of less than about 5 $\mu$m selected from the group consisting of -alumina, transition aluminas, aluminum oxide monohydroxide, or aluminum trihydrate having; and, (3) one or more of the components of delaminated kaolin having a mean particle size of less than about 2 $\mu$m, calcined kaolin exhibiting a mean particle size of less than about 2 μm and a surface area of greater than about 10 m²/g and/or silica having a mean particle size of less than about 5 μm.

This invention also relates to an extrudable mixture that comprises the above-mentioned raw material mixture and an organic binder system. Still further, this invention relates to a method of producing a green body of cordierite-forming materials comprising preparing a plasticizable raw material mixture as defined above, adding an organic binder system to the mixture and mixing the mixture to form an extrudable mixture, and extruding the mixture to form a substrate having the desired configuration. The green body is dried and fired to yield a ceramic substrate having cordierite as its primary phase.

DETAILED DESCRIPTION OF THE INVENTION

Figure 1:
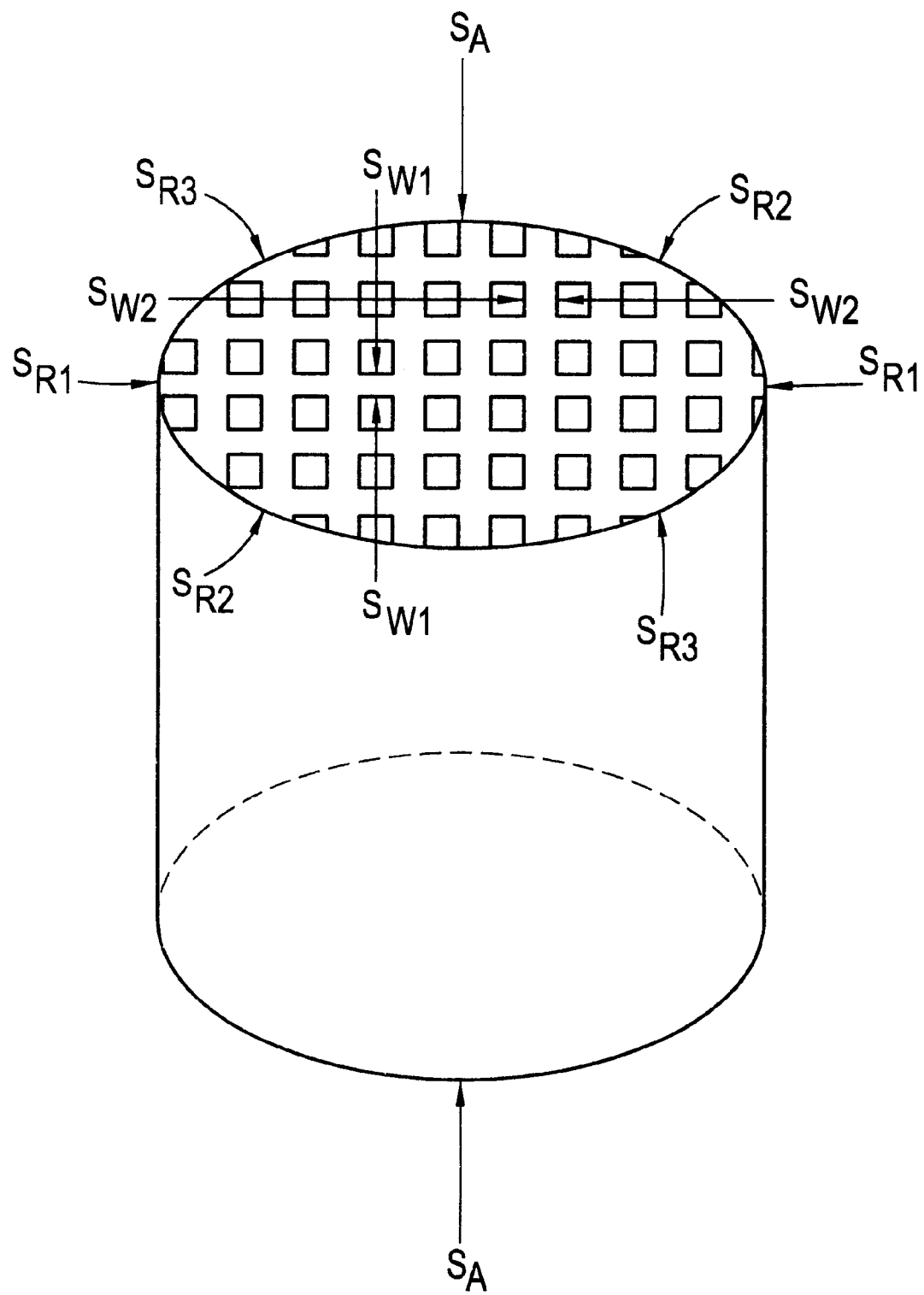
FIG. 1 illustrates a typical honeycomb ceramic body and includes designations of the various shrinkage directions exhibited by the honeycomb.

The present invention discloses a method for producing cordierite honeycomb monoliths with very thin webs. Specifically, it relates to a method of extruding a novel mixture of ceramic batch materials together with a binder and extrusion vehicle to produce a honeycomb body. Upon firing the dried green body, to produce the cordierite phase, the body undergoes an anisotropic shrinkage, with the thickness of the webs shrinking much more than in the radial or axial directions. An examination of FIG. 1 illustrates the shrinkage directions as indicated above; web direction ($S_{W1}$ and $S_{W2}$), axial direction ($S_A$) and radial direction ($S_{R1}$, $S_{R2}$, $S_{R3}$) Honeycomb bodies with ultra-thin webs are produced through the use of a set of raw materials which result in (1) a high level of overall shrinkage (radial/axial) in the body during firing, preferably 5–20%, and more preferably 8–14% radial shrinkage, and (2) a high degree of anisotropic shrinkage whereby the shrinkage in the plane of the web (typically 10–40%) is higher than in the axial or radial directions; i.e., a web plane-to-overall (radial/axial) shrinkage ratio which is greater than 1.0, and preferably between 1.4 to 3.0, with ratios larger than 3.0 being contemplated.

Typically, in the preparation of cordierite articles, talc and clay raw particles are mixed in proportion with sources of alumina and silica yielding precursors to provide the raw material mixture having a composition, in percent by weight of 11 to 17% MgO, 33 to 41% $Al_2O_3$ and, 46 to 53% $SiO_2$. The present invention involves the determination that the utilization of raw materials that are platy, exhibit a high surface area and possess a small average particle size. In accordance with the present invention provided is a plasticizable mixture for use in preparing a substrate having cordierite as its primary phase. Specifically, the plasticizable mixture is made up of a raw material mixture specifically comprising the following:

(1) a platy talc having a morphology index of greater than 0.8 and exhibiting a mean particle size of less than about 10 μm when measured by a Sedigraph particle analyzer (Micromeritics);

(2) an $Al_2O_3$ forming source comprising an alumina having a mean particle size of less than about 5 μm selected from the group consisting of -alumina, transition aluminas, aluminum oxide monohydroxide, or aluminum trihydrate having; and, (3) one or more of the components of delaminated kaolin having a mean particle size of less than about 2 μm, calcined kaolin exhibiting a mean particle size of less than about 2 μm and a surface area of greater than about 10 m²g and/or silica exhibiting a mean particle size of less than about 2 μm.

The present invention overcomes the problems associated with extrusion of very thin walled substrates by using firing shrinkage as a way to achieve the very thin walled matrix. As previously stated, the composition materials are selected to generate an anisotropic shrinkage upon firing wherein the shrinkage in the plane of the web ($S_{W1}$ and $S_{W2}$) is greater than the axial ($S_A$) or radial ($S_{R1}$, $S_{R2}$, $S_{R3}$) shrinkage of the honeycomb substrate; again see FIG. 1. In this way, wider slots may be used in the die, allowing for much fewer extrusion defects such as breaks in the web from plugged die slots, distorted cells arising from differential flow, and slump due to the presence of thicker webs in the wet extrudate. The dried green extrudate is then fired in the conventional manner, and during sintering and densification of the body, a high degree of shrinkage may be encountered if the raw materials have been chosen correctly, especially in the plane of the webs. It is important to maximize the shrinkage in the plane of the webs compared to the shrinkage in the radial or axial direction. A high level of shrinkage in the axial and radial directions can lead to firing defects such as firing cracks and distortion; defects that are important to avoided.

This anisotropic shrinkage allows for easier extrusion, and die manufacture of thicker slots than with direct extrusion of very thin webs and use of conventional die technology. In addition, the relatively lower axial and radial shrinkage of the honeycomb allow for minimizing defects associated with high shrinkage, such as shape retention and firing cracks.

As mentioned above, the present invention relates to a method for producing cordierite honeycomb bodies with ultra-thin webs through the use of a set of raw materials which result in (1) a high level of overall (axial or radial shrinkage) in the body during firing, preferably 5–20%, and more preferably 8–14%, and (2) anisotropic shrinkage whereby the shrinkage in the plane of the web is higher than in the axial or radial directions; i.e., a web plane-to-overall (radial/axial) shrinkage ratio which is greater than 1.0, and preferably between 1.4 to 3.0. Stated differently the shrinkage is 1.4–3 times higher in the plane of the web than it is in the radial or axial directions.

The choice of inorganic raw materials is critical to achieve the desired shrinkage effects. The materials should be chosen to give a stoichiometry close to that of cordierite. The high level of shrinkage is achieved by using materials with a very high surface area and fine particle size. Most preferred for this application is the use of a dispersible boehmite with surface area in excess of 100 m²/gm. The boehmite should be used in levels greater than about 5% by weight of the batch, and preferably greater than about 10% by weight. Silica particles with very high surface area (>50 m²/gm) may also be used, preferably in levels greater than about 5 weight %. If calcined clay is used, it should be very fine, preferably with average particle size less than 2 μm, and more preferably less than 1 μm with a surface area >10 m²/gm.

The choice of talc and kaolin are very important to achieve the anisotropic shrinkage in the plane of the webs. It is thought that platelets of talc and clay are oriented in the plane of the web during extrusion through the thin slots in the die, and during the firing process, a differential shrinkage occurs where the maximum shrinkage occurs in a direction perpendicular to the basal planes of the hydrated sheet silicate structure. It is believed that the differential shrinkage results from the anisotropy in particle packing due to the particle orientation from the extrusion process which results in a higher degree of densification in the plane of the webs than in the 2 directions perpendicular (axial and radial). In addition, during firing, a shrinkage anisotropy in the hydrated talc and kaolin particles can be transferred to the substrate if the particles are aligned within the plane of the web where the high shrinkage direction of the particles is perpendicular to the basal plane resulting in a higher degree of shrinkage within the plane of the webs of the substrate than in the 2 directions perpendicular (radial and axial). In order to maximize the shrinkage anisotropy, it is preferred that the kaolinite and talc particles be very platy in order to maximize the preferred orientation of the particles in the plane of the web during the extrusion process. For the talc, it is preferred that a macrocrystalline ore be used in order to maximize platy morphology. Preferably, the platiness as measured by the morphology index should be greater than 0.8 and more preferably greater than 0.9. In addition, the talc should be fine, less than 5 $\mu$m average particle size, and more preferably less than 3 $\mu$m with a surface area in excess of 5 m$^2$/gm. With respect to the kaolinite, it should be delaminated. If it is not delaminated, the stacks of layers can have a very low aspect ratio, making orientation with the basal planes parallel to webs difficult. In addition to the delamination process, the raw clay should also be fine in order to maximize shrinkage. The average particle size should be less than about 2 $\mu$m, and preferably submicron. The surface area should be >10 m$^2$/gm.

The silica forming source comprises silica raw materials including fused $SiO_2$; colloidal silica; crystalline silica, such as quartz or cristobalite, or a low-alumina substantially alkali-free zeolite. Additionally, the silica-forming source can comprise a compound that forms free silica, when heated, for example, silicic acid or a silicon organometallic compound.

The $Al_2O_3$-forming source, for the purposes of the instant invention is a compound which, when heated, forms $Al_2O_3$. Regarding the $Al_2O_3$ source, that material is selected from the group consisting of alumina, aluminum hydroxide, aluminum oxyhydroxide, and combinations thereof. A particularly preferred source comprises a highly reactive $\alpha$-alumina or aluminum hydroxide having a particle size of about one micron or less. A more preferred $Al_2O_3$ forming materials having a surface area greater than 40 m$^2$/g, that material includes a compound selected from the group consisting of "transition" or activated aluminas, such as gamma alumina, and aluminum oxyhydroxide; preferably this source comprises boehmite or pseudoboehmite.

Clay as used herein means either calcined or raw clay, the clay preferably comprising a kaolin.

The magnesium source comprises a platy talc, that is a talc that exhibits a platelet particle morphology, that is, particles having two long dimensions and one short dimension, or, a length and width of the platelet that is much larger than its thickness. It is preferred that the talc possess a morphology index greater than about 0.8. The morphology index (refer to U.S. Pat. No. 5,141,686) is a measure of the degree of platiness of the talc. One typical procedure for measuring the morphology index is to place the sample in a holder so that the orientation of the platy talc is maximized within the plane of the sample holder. The x-ray diffraction pattern is then determined for this oriented talc. The morphology index semi-quantitatively relates the platy character of the talc to its XRD peak intensities using the following equation:

$$M = \frac{I_x}{I_x + 2I_y}$$

where $I_x$ is the intensity of the (004) peak and $I_y$ is that of the (020) reflection.

The aforementioned raw materials of which the plasticized mixture is comprised are combined in a mixing step sufficient to produce an intimate mixing of the raw material phases to allow complete reaction in thermal processing. A binder system is added at this point to help create an extrudable mixture that is formable and moldable. A preferred binder system for use in the present invention comprises a cellulose ether binder component selected from the group consisting of methylcellulose, methylcellulose derivatives, and combinations thereof, a surfactant component, preferably stearic acid or sodium stearate, and a solvent comprising water. Excellent results have been obtained utilizing a binder system which comprises the following amounts, assuming 100 parts by weight of the inorganic, alumina and silica forming sources and talc, raw material mixture: about 0.2 to 2 parts by weight of the sodium stearate, about 2.5 to 6.0 parts by weight of a methylcellulose or a hydroxypropyl methylcellulose binder, and about 20–50 parts by weight of the water.

The individual components of the binder system are mixed with a mass of the inorganic powder material, e.g., the talc, alumina and silica forming sources mixture, in a suitable known manner, to prepare an intimate mixture of the ceramic material and the binder system capable of being formed into a ceramic body by, for example, extrusion. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a thin-walled honeycomb substrate suitable for use as a catalyst support, extrusion through a die is preferable.

The prepared ceramic green body is then dried for a period of about 5–20 minutes prior to firing by any conventional method such as either hot-air or dielectric drying. The dried green body is thereafter fired at a sufficient temperature for a sufficient time to result in a fired ceramic body containing cordierite as its primary phase. The firing conditions can vary depending on the process conditions such as specific composition, size of the green body, and nature of the equipment. However, some preferred firing conditions are as follows:

heating the green body to a temperature of between about 1380° C. to about 1450° C. holding at this temperature for about 6 hours to about 16 hours, and thereafter cooling the green body to room temperature.

As indicated previously, a primary utility of the mixtures described herein is for preparing high strength cordierite honeycomb substrates useful as catalyst carriers. Although the invention is particularly advantageous for preparing thin-walled honeycombs, the claimed mixtures can also be used for thicker walled structures. Methods of applying catalysts to the honeycomb structures, and utilizing those structures, for example, in automobile exhaust systems, are well known in the art. The mixtures may also be useful for preparing other high strength cordierite structures, such as filters.

EXAMPLES

To further illustrate the principles of the present invention, there will be described several examples of the ceramic bodies formed according to the invention, as well as several comparison examples. However, it is to be understood that the examples are given for illustrative purpose only, and the invention is not limited thereto, but various modifications and changes may be made in the invention, without departing from the spirit of the invention.

Examples 1–5

Inorganic powder batch mixtures, as listed in percent by weight, suitable for the formation of a ceramic body having cordierite as its primary crystalline phase are listed in Table I: Examples 1 and 4 comparison; Examples 2–3, 5 inventive. Each of compositions 1–5 was prepared by combining and dry mixing together the components of the designated inorganic mixture as listed in Table 1. To these mixtures was added an appropriate amount of organic binder and this intermediate mixture was thereafter further mixed with deionized water to form a plasticized ceramic batch mixture.

Table I additionally reports various properties of the commercially available raw materials utilized in Examples, specifically those properties discussed as being important for the formation of cordierite bodies capable of exhibiting anisotropic shrinkage. Included in the table are the following important raw material characteristic properties: morphology index, the surface area ($m^2/g$) and average particle diameter ($\mu m$).

Each of the various plasticized mixtures was extruded through an extruder under conditions suitable to form 1¼ in. diameter (6.35 mm), 4–8 in long, 400 cell/$in^2$ (24.4 cells/$cm^2$) honeycomb substrates having and 2–4 mils (0.20 mm) thick cell walls. The green ceramic honeycombs formed from each of the 5 batch compositions were sufficiently dried to remove any water or liquid phases that might be present and thereafter subjected to a heating and firing cycle sufficient to remove the organic binder system from, and to sinter, the extruded rods and honeycombs. Specifically, the green bodies of each type substrates were fired to between 1405 and 1430° C. and held for a period of about 10 hours; i.e., firing conditions suitable for forming ceramic bodies having cordierite as their primary phase.

Table I additionally reports selected properties for the ceramics produced from the batches reported in the Table. Properties included for each of the ceramic bodies included the radial and web shrinkage and the resultant shrinkage ratio (web/radial). Additionally included are the average coefficient of thermal expansion (CTE) of the ceramic rod over the temperature range from about 25° C. to 800° C. ($\times 10^{-7}$/° C.) and the porosity, as measured by Hg porosimetry expressed in volume percent.

TABLE I

|  | 1 | 2 | 3 | 4 | 5 | 6 |
|---|---|---|---|---|---|---|
| Macrocrystalline Talc (coarse) (6.2 $\mu m$) |  | 40.38 |  |  |  |  |
| Macrocrystalline Talc (mid) (4.2 $\mu m$) |  |  | 40.38 |  |  |  |
| Macrocrystalline Talc (fine) (1.6 $\mu m$) |  |  |  |  | 40.05 | 39.95 |
| Microcrystalline Talc (coarse) (6.6) | 40.38 |  |  | 40.05 |  |  |
| Calcined Clay | 19.25 | 19.25 | 19.25 | 19.09 | 19.09 | 24.73 |
| Raw Clay | 15.28 | 15.28 | 15.28 | 15.15 | 15.15 | 16.55 |
| Alumina (2–25 $m^2/g$: 0.5–5 $\mu m$) | 18.84 | 18.84 | 18.84 | 14.01 | 14.01 | 5.73 |
| Quartz | 6.25 | 6.25 | 6.25 | 6.2 | 6.2 | 2 |
| Boehmite (180 $m^2/g$) |  |  |  | 5.49 | 5.49 | 11.05 |
| Talc Morphology Index | 0.72 | 0.92 | 0.92 | 0.72 | 0.92 | 0.92 |
| Shrinkage (Radial) | 3.8 | 2.5 | 2.4 | 5.5 | 6.1 | 11.3 |
| Shrinkage (Web) | 2.1 | 4.6 | 4.7 | 3.1 | 11.9 | 22.7 |
| Shrinkage Ratio (Web/Radial) | 0.55 | 1.84 | 1.96 | 0.56 | 1.95 | 2.01 |
| CTE ($\times 10-7/$° C. RT-800° C.) | 5.8 | 5.0 | 6.2 | 4.7 | 5.3 | 3.5 |
| Total Porosity (%) | 36.0 | 40.3 | 39.0 | 35.0 | 39.6 | 25.8 |
| Median Pore Diameter ($\mu m$) | 4.3 | 3.7 | 2.5 | 3.9 | 2.1 | 0.9 |

Attached in Table 1 is data which helps to demonstrate the unique shrinkage properties possible with certain raw material combinations. Included in the table are compositions using a variety of talc particle sizes and morphologies. The talc morphology or shape is driven by the origin of the talc source. There are two types of talc deposits—microcrystalline and macrocrystalline. The microcrystalline deposit is formed from a fine-grained dolomitic source, while the macrocrystalline talc is formed from a serpentine source. The microcrystalline talc typically has a grain size less than 5 $\mu m$ whereas the macrocrystalline talcs typically have an average grain size in excess of 200 $\mu m$. Talc sourced from the macrocrystalline deposit typically exhibits a very platy morphology since each particle (in a distribution suitable for the production of cordierite honeycombs) is single crystal. Therefore the platy particle morphology is determined by the crystal habit. On the other hand, talc sourced from a microcrystalline deposit can have particles with a diameter that exceeds the average grain size of the talc crystals of which it is composed. These particles are therefore made up from a number of grains that are fused together into a single particle. The grains can often have a random orientation relative to one another, and thus the particle morphology is not necessarily determined by the crystal habit. As a result, microcrystalline talcs have a more isomorphic shape and can appear to be "blocky" when compared to a macrocrystalline talc particle.

Table 1 shows several compositions that show the effect of the talc particle morphology on the degree of anisotropy in the shrinkage of a honeycomb body. When a microcrystalline talc source is used, the shrinkage through the thickness of the web is equal to or less than the shrinkage in the axial and radial directions. This is not conducive to the formation of cordierite honeycombs with very thin webs. However, it can be also be seen that when a macrocrystalline talc is used, the shrinkage is higher in the thickness of the web than in directions perpendicular. The ratio of web shrinkage to radial shrinkage is almost 4 times as high as in the case of the compositions containing microcrystalline talc.

It can further be seen that the use of a dispersible boehmite source can increase the overall shrinkage of the body, but it does not appear to influence the ratio of web to radial shrinkage.

Compositions that are most attractive for the formation of cordierite honeycombs with very thin webs are those that have at least 5%, preferably 8–14%, shrinkage in the plane of the webs. Those are the inventive compositions outlined here.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A method of producing a ceramic body having cordierite as its primary phase, comprising the following steps:
    compounding and plasticizing a cordierite-forming raw material mixture having a chemical composition consisting essentially of about, by weight, 11 to 17% MgO, 33 to 41%, $Al_2O_3$ and, 46 to 53% $SiO_2$; the mixture comprising the following:
        (a) a magnesium-source comprising a platy talc having a morphology index of greater than 0.8 and exhibiting a mean particle size of less than about 5 $\mu$m;
        (b) an $Al_2O_3$-forming source comprising an alumina having a mean particle size of less than about 5 $\mu$m selected from the group consisting of -alumina, transition aluminas, aluminum oxide monohydroxide, or aluminum trihydrate;
        (c) one or more of the components of kaolin, calcined kaolin, and silica wherein the kaolin, if present, comprises delaminated kaolin having a mean particle size of less than about 2 $\mu$m and a surface area of greater than about 10 $m^2/g$, the calcined kaolin, if present,: exhibits a mean particle size of less than about 211m, and silica, if present, exhibits mean particle size of less than about 2 $\mu$m;
    forming the plasticizable raw material mixture into a green ceramic body by extrusion through an extrusion die to at least partially align the raw materials in an orientation plane in such a manner that the shrinkage of the green ceramic body upon firing is anisotropic and is greater in direction perpendicular to the orientation plane than in an at least one other direction in the green ceramic body;
    drying the green body and thereafter firing the green body at a time and at a temperature between 1380° C. and 1450° C. to result in sintered ceramic body.

2. The method according to claim 1 wherein the forming of the plasticizable raw material mixture into a green ceramic body is accomplished by extrusion through a honeycomb extrusion die and the orientation plane is generally parallel to the web direction and the shrinkage of the green ceramic honeycomb body upon firing is in a direction perpendicular to the web direction and is 1.4 to 3.0 times greater than the shrinkage in the axial and radial directions of the honeycomb body.

3. The method of claim 1 wherein the raw material mixture includes an $Al_2O_3$-forming source comprising dispersible boehmite having a surface area of greater than about 100 $m^2/g$ in an amount at least as great as 2% by weight of the total inorganic raw material mixture.

4. The method of claim 1 wherein the raw material mixture includes silica in an amount comprising at least about 5% by weight of the total inorganic raw material mixture.

5. The method of claim 1 wherein the raw material mixture includes calcined kaolin exhibiting a mean particle size of less than about 1 $\mu$m and a surface area of greater than about 10 $m^2/g$.

6. The method of claim 1 wherein the raw material mixture includes a magnesium-source comprising a platy talc exhibiting a morphology index of greater than 0.9 and a mean particle size of less than about 3 $\mu$m.

7. The method of claim 6 wherein the magnesium-source comprising a platy talc exhibits a surface area of greater than about 5 $m^2/g$.

8. The method of claim 1 wherein the raw material mixture further includes a delaminated kaolin exhibiting a mean particle size of less of less than about 1 $\mu$m.

9. A method of producing a ceramic honeycomb body having cordierite as its primary phase, comprising the following steps:
    compounding and plasticizing a cordierite-forming raw material mixture the mixture comprising the following:
        (a) a magnesium-source comprising a platy talc having a morphology index of a greater than 0.8 and exhibiting a mean particle size of less than about 5 $\mu$m;
        (b) an $Al_2O_3$-forming source comprising an alumina having a mean particle size of less than about 5 $\mu$m selected from the group consisting of -alumina, transition aluminas, aluminum oxide monohydroxide, or aluminum trihydrate;
        (c) one or more of the components of kaolin, calcined kaolin, and silica wherein the kaolin, if present, comprises delaminated kaolin having a mean particle size of less than about 2 $\mu$m and a surface area of greater than about 10 $m^2/g$, the calcined kaolin, if present, exhibits a mean particle size of less than about 2 $\mu$m, and silica, if present, exhibits mean particle size of less than about 2 $\mu$m;
    forming the plasticizable raw material mixture into a green ceramic honeycomb body by extrusion through an extrusion die to at least partially align the raw materials in an orientation plane in such a manner that the shrinkage of the green ceramic body upon firing is anisotropic and is greater in direction perpendicular to the orientation plane than in at least one other direction in the green ceramic honeycomb body;
    drying the green honeycomb body and thereafter firing the green body at a time and at a temperature between 1380° C. and 1450° C. to result in sintered ceramic body.

10. The method according to claim 9 wherein the forming of the plasticizable raw material mixture into a green ceramic body is accomplished by extrusion through a honeycomb extrusion die and the orientation plane is generally parallel to the web direction and the shrinkage of the green ceramic honeycomb body upon firing is in a direction perpendicular to the web direction and is 1.4 to 3.0 times greater than the shrinkage in the axial and radial directions of the honeycomb body.

11. The method according to claim 10 wherein the plasticizable raw material is a talc-boehmite containing raw material mixture and comprises the following:
    (a) an $Al_2O_3$-forming source comprising a dispersible boehmite having a surface area of greater than about 100 $m^2/g$ and comprising at least about 2% by weight of the total inorganic raw material mixture; and, (b) a magnesium-source comprising a platy talc exhibits a morphology index of greater than 0.9 and a mean particle size of less than about 3 μm.

12. The method of claim 11 wherein the silica comprises at least about 5% by weight of the total inorganic raw material mixture.

13. The method of claim 11 wherein the calcined kaolin exhibits mean particle size of less than about 1 μm and a surface area of greater than about 10 m²/g.

14. The method of claim 11 wherein the delaminated kaolin exhibits a mean particle size of less of less than about 1 μm.

15. The method of claim 11 wherein the magnesium-source comprises a platy talc exhibiting a surface area of greater than about 5 m²/g.

* * * * *

UNITED STATES PATENT AND TRADEMARK OFFICE
CERTIFICATE OF CORRECTION

PATENT NO. : 6,506,336 B1  
DATED : January 14, 2003  
INVENTOR(S) : Beall et al.

It is certified that error appears in the above-identified patent and that said Letters Patent is hereby corrected as shown below:

<u>Title page,</u>
Item [57] ABSTRACT,
Line 10, "-alumina" should be -- α-alumina --

<u>Column 2,</u>
Line 63, "-alumina" should be -- α-alumina --

<u>Column 3,</u>
Line 63, "-alumina" should be -- α-alumina --

<u>Column 9,</u>
Line 27, "-alumina" should be -- α-alumina --

<u>Column 10,</u>
Line 21, "of a greater" should be -- of greater --
Line 25, "-alumina" should be -- α-alumina --

Signed and Sealed this

Fifth Day of August, 2003

JAMES E. ROGAN
*Director of the United States Patent and Trademark Office*